United States Patent [19]
Kiser

[11] Patent Number: 6,097,330
[45] Date of Patent: Aug. 1, 2000

[54] OPTICAL FRIENDLY FIRE AVOIDANCE SYSTEM

[75] Inventor: Larry Dee Kiser, Roanoke, Va.

[73] Assignee: ITT Corporation, New York, N.Y.

[21] Appl. No.: 08/006,253

[22] Filed: Jan. 19, 1993

[51] Int. Cl.[7] .................................................. G01S 13/78
[52] U.S. Cl. ............................................ 342/45; 359/155
[58] Field of Search .......................... 359/152, 154–155, 359/168, 169, 170, 172; 342/45, 43, 54

[56] References Cited

U.S. PATENT DOCUMENTS

| | | | |
|---|---|---|---|
| 3,584,220 | 6/1971 | Sadeo ........................................ | 359/169 |
| 3,633,158 | 1/1972 | Jerome D ................................. | 359/169 |
| 4,064,434 | 12/1977 | Waksberg ................................ | 359/170 |
| 4,099,050 | 7/1978 | Sauermann .............................. | 359/155 |
| 4,731,879 | 3/1988 | Sepp et al. ............................... | 359/172 |
| 4,837,575 | 6/1989 | Conner, Sr. .............................. | 342/45 |
| 4,887,310 | 12/1989 | Meyzonnette et al. ................ | 359/172 |
| 5,001,488 | 3/1991 | Joguet ..................................... | 359/155 |
| 5,130,713 | 7/1992 | Wagner .................................... | 342/45 |
| 5,274,379 | 12/1993 | Carbonneau et al. .................. | 342/45 |

FOREIGN PATENT DOCUMENTS 0072427   4/1986   Japan ..................................... 359/172

*Primary Examiner*—Mark Hellner

[57] ABSTRACT

A friendly fire avoidance system employing a two-way communications system using the transmission and the receipt of optical pulses to enable a first concentration of ground troops to identify a second, unidentified concentration of ground troops as friendly or hostile before attacking the second, unidentified concentration of troops.

20 Claims, 3 Drawing Sheets

OPTICAL FRIENDLY FIRE AVOIDANCE SYSTEM

FIELD OF THE INVENTION

This invention relates to an optical communications system, and more particularly to a two-way optical communications system used to prevent friendly armed forces from accidentally firing upon one another.

BACKGROUND OF THE INVENTION

A common problem encountered by modern armed forces during the confusion of battle, as evidenced during the Gulf War, is the phenomenon known as "friendly fire" in which forces accidentally fire on their own troops causing unnecessary casualties and fatalities. Instances of friendly fire often involve aircraft or helicopters accidentally firing on their own ground troops. In addition, such incidents often occur at night when visibility is poor. Conventional techniques employed to make ground troops and their equipment more easily identifiable and thus prevent such mishaps from occurring include placing visual identifying markers such as inverted letters or geometric designs on armored equipment such as tanks, armored personnel carriers, etc., and placing brightly colored tarps on such equipment. In addition, conventional two-way radios are employed to enable troops to communicate with one another and thus prevent such mishaps.

All of the aforementioned techniques suffer from drawbacks. The aforementioned visual markers and colored tarps are only visible during the day. Thus, they will not eliminate friendly fire incidents which might occur at night. Moreover, such markings and tarps are not readily visible by different concentrations of ground forces which are separated over relatively large distances. Furthermore, since markings and tarps are only visible by a pilot flying at relatively close distances to any equipment so marked, the possibility exists that a who pilot flies near an unidentified concentration of ground troops to see if they are so marked will be attacked if such troops turn out to be the enemy.

The drawback to using conventional two-way radios to identify troops is that if the unidentified troops are enemy troops and if they are monitoring the frequency over which such transmissions are made, they will be alerted to the presence of a potentially hostile force. In addition, since the initial transmission might have to be sent several times in order to contact the unidentified troops, and since a given period of time will in all likelihood elapse before a response is received, such lapses of time make it more likely that the unidentified troops might discover the presence of the troops sending the initial transmission and attack such troops while they are waiting for the response.

It is, therefore, an object of this invention to provide a two-way communications system which uses the transmission of optical pulses of a relatively narrow bandwidth to enable armed forces of one side to instantaneously determine whether unidentified forces are friendly or unfriendly without alerting such unidentified forces to the fact that they are being identified.

SUMMARY OF THE INVENTION

A friendly fire avoidance system employing a two-way communications system using the transmission and the receipt of optical pulses to enable a first concentration of ground troops to identify a second, unidentified concentration of ground troops as friendly or hostile before attacking the second, unidentified concentration of troops. The friendly fire avoidance system can also be used between ground troops and an unidentified aircraft and between an aircraft and an unidentified concentration of ground troops.

DETAILED DESCRIPTION OF THE FIGURES

Figure 1:
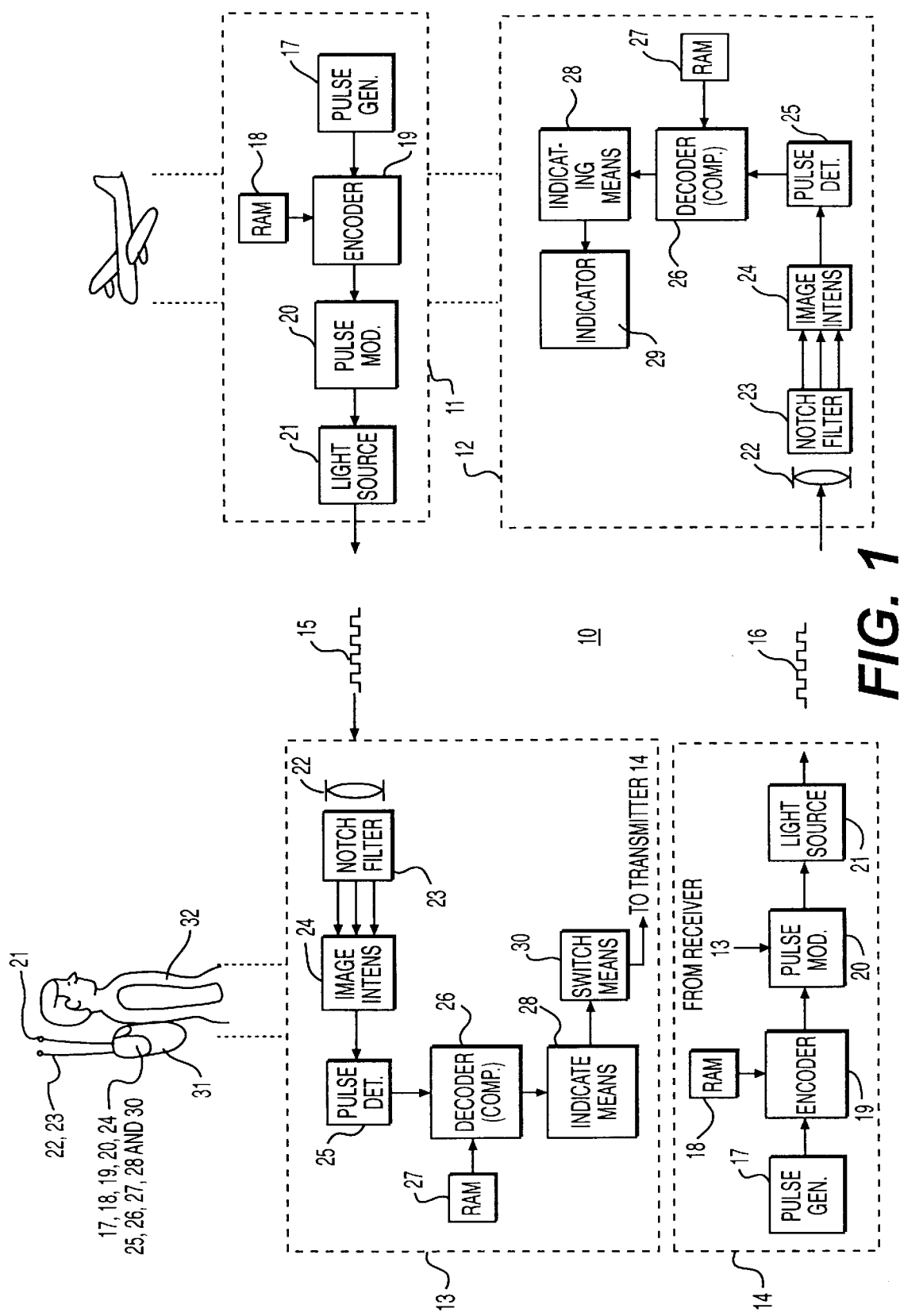
FIG. 1 shows an exemplary embodiment of the friendly fire avoidance system according to this invention.

Referring to FIG. 1, there is shown an Optical Friendly Fire Avoidance System (OFFAS) 10 according to the present invention. FIG. 1 shows the OFFAS 10 as it would be used by a pilot of a friendly aircraft trying to identify an unidentified concentration of ground troops. The aircraft will be equipped with a first part of the OFFAS 10 comprised of a first transmitter 11 and a first receiver 12. The unidentified troops will, if they are friendly, be equipped with a second part of the OFFAS 10 comprised of a second receiver 13 and a second transmitter 14. The first transmitter 11 is a directional aimable transmitter which transmits a first series of pulses 15 towards the unidentified troops. Receipt of these first pulses by friendly troops equipped with receiver 13 results in a second series of pulses 16 being transmitted by transmitter 14, which is a multidirectional transmitter, back towards the aircraft, which second pulses are received by receiver 12.

Transmitters 11 and 14 each include a pulse generator 17, a random access memory (RAM) 18, an encoder 19, a pulse modulator 20 and a light source 21. RAM 18 is used to set a code with which encoder 19 encodes an electrical pulse generated by pulse generator 17. The encoded electrical pulse is modulated by pulse modulator 20 and is converted to an optical pulse by light source 21. RAMs are only one of many conventional devices, e.g. switches, which can be used to set the code. These other devices could be discerned by one skilled in the art.

Receivers 12 and 13 each include a wide-angle lens 22, a narrow band notch filter 23, an image intensifier 24, a pulse detector 25, a decoder/comparator 26, a RAM 27 and an indicating means 28. A photomultiplier or infrared detector can be used in place of the image intensifier 24. Receiver 12 further includes an audible or visual indicator 29, whereas receiver 13 further includes a switch means 30 coupled to the transmitter 14. Optical pulses 15 and 16 received by receivers 13 and 12, respectively, are detected by lens 22 and filtered by filter 23. The filtered pulses 15 and 16 are intensified by image intensifier 24 and are then detected by detector 25. The detected pulses are then decoded by decoder/comparator 26, and if the detected pulses are encoded with the code set in RAM 27, which code matches the code of RAM 18, then indicating means 28 provides an appropriate signal to indicator 29 (receiver 12) or to switch means 30 (receiver 13). The codes of the RAMs 18 and 27 can be periodically changed, be it every five minutes, every hour, every day, etc. The transmitters 11 and 14 consist of narrow frequency light sources matched to the narrow band notch filter 23 of receivers 12 and 13.

The OFFAS 10 shown in FIG. 1 operates as follows. If the pilot of the aircraft equipped with the OFFAS 10 wants to determine whether the unidentified troops are friendly or hostile, then before attacking, the pilot will activate from the cockpit of the aircraft the first transmitter 11 to direct the first series of pulses 15 towards the unidentified troops. The first transmitter 11 is mounted on the aircraft.

If the unidentified troops are friendly, they will be equipped with the second receiver 13 of the OFFAS 10 for receiving the first series of optical pulses 15. If decoder 26 of receiver 13 determines that the code with which received pulses 15 are encoded matches the code set in RAM 27, then indicating means 28 will provide an appropriate signal which will trigger switch means 30, thereby automatically causing the second transmitter 14 to transmit the second pulses 16 in response to the first pulses 15. As shown in FIG. 1, receiver 13 and transmitter 14 can be carried in a field pack 31, or alternatively on an equipment belt, worn by a soldier 32 from among the unidentified troops.

The second series of pulses 16 are received by the first receiver 12 which is mounted on the aircraft. If decoder 26 of receiver 12 determines that the code with which received pulses 16 are encoded matches the code set in RAM 27, then indicating means 28 will provide an appropriate signal which will cause the audible or visual indicator 29 to sound or illuminate, respectively, in the cockpit of the aircraft, thereby indicating to the pilot that the unidentified troops are friendly and should not be attacked. If the aircraft is equipped with an NVG or FLIR system, the source of the second series of pulses 16 can be determined to verify the location from which the second pulses 16 were transmitted. If the code with which the received pulses 16 are encoded does not match the code set in RAM 27, or if no response is received by the first receiver 12 within a given period of time after the first pulses 15 have been sent, then a second audible or visual alarm, different from the first alarm will sound in the cockpit to inform the pilot that the unidentified forces are hostile and can be attacked.

Figure 2:
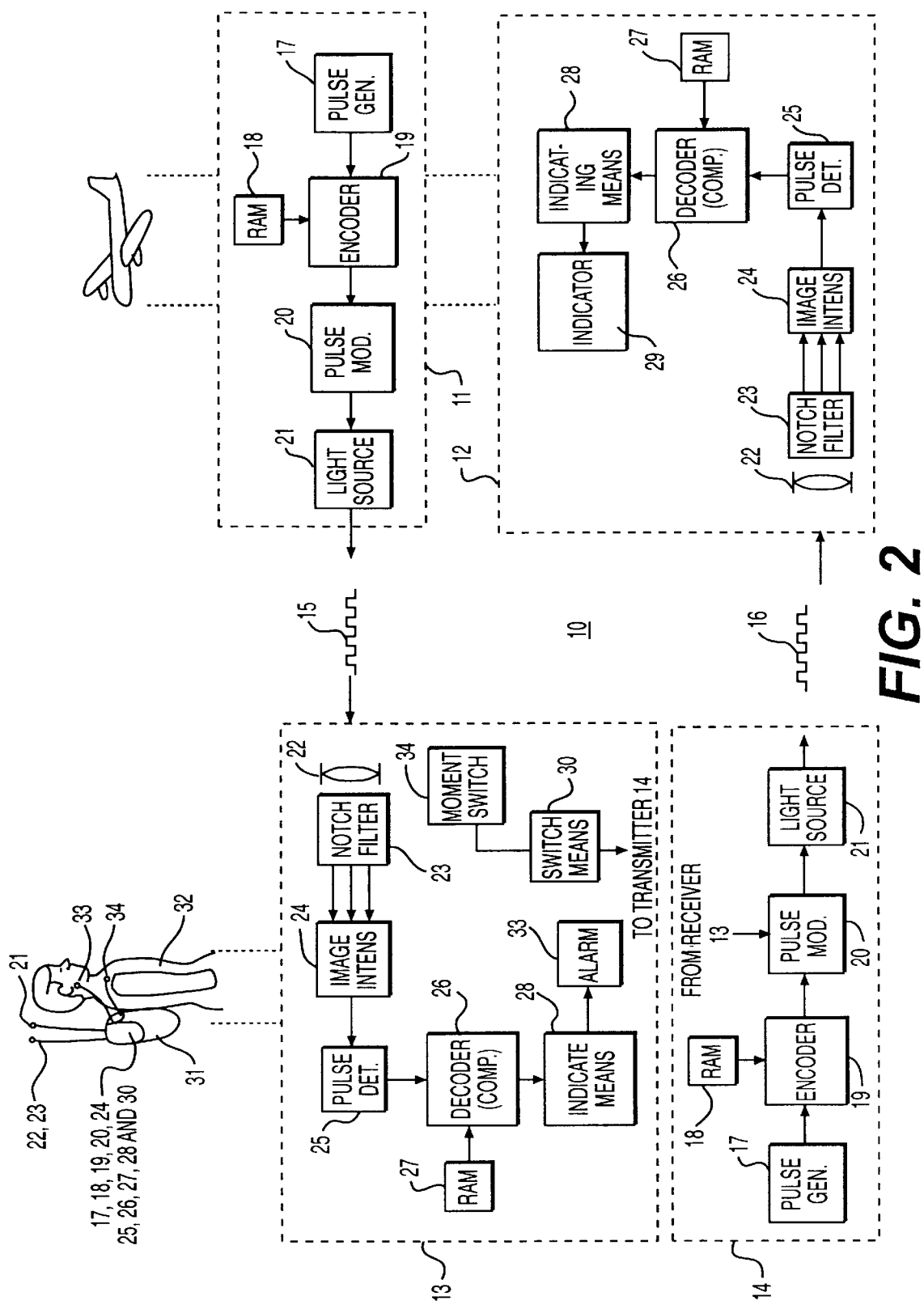
FIG. 2 shows the friendly fire avoidance system of FIG. 1 with a manually activated second transmitter.

FIG. 2 shows the OFFAS 10 shown in FIG. 1 with a manually activated, rather than automatically activated second transmitter 14. Numerals used in FIG. 1 are employed in FIG. 2 to denote identical parts. As in FIG. 1, receiver 13 and transmitter 14 are carried by the soldier 32 who also wears an audible alarm earpiece 33 and is equipped with a momentary switch 34. If decoder 26 of receiver 13 determines that the code with which received pulses 15 are encoded matches the code set in RAM 27, then indicating means 28 will provide an appropriate signal which will cause the audible alarm earpiece 33 to sound, thereby alerting the soldier 32 to immediately depress the momentary switch 34 to activate the second transmitter 13. In this manner the second series of pulses 16 are transmitted as previously described. The momentary switch 34 is coupled to the switch means 30. The second transmitter 14 can be set to be either automatically or manually activated.

Figure 3:
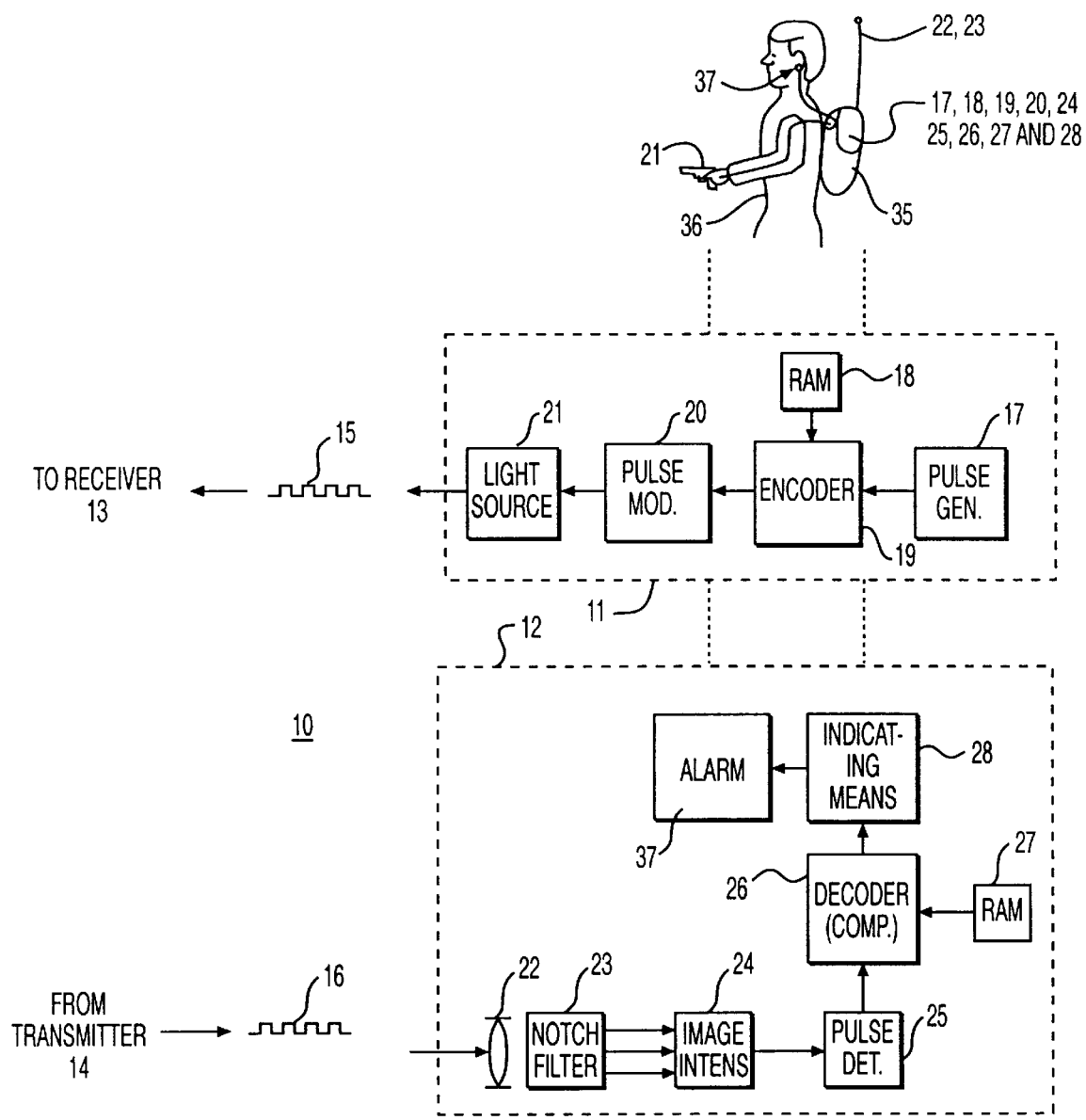
FIG. 3 shows a second embodiment of the friendly fire avoidance system according to this invention.

The OFFAS can also be used by a first concentration of friendly troops to identify a second concentration of unidentified troops as friendly or hostile. The first transmitter 11 and the first receiver 12 can be carried, as shown in FIG. 3, in a field pack 35, or on a field belt, worn by a soldier 36 from the first concentration troops. In this second embodiment of the OFFAS 10, the light source 21 of the directional aimable transmitter 11 will be pistol shaped. The unidentified troops will, if friendly, be equipped with the second receiver 13 and the second transmitter 14 as previously discussed in the description of FIGS. 1 and 2. The transmitter 14 can be set to be either automatically (FIG. 1) or manually (FIG. 2) activated. Alternatively, the first transmitter 11 and the first receiver 12 could be mounted on armored equipment used by the friendly troops in which case the visual or audible alarm 29 will sound inside of the armored equipment.

The soldier 36 who carries the first transmitter 11 and the first receiver 12 will also be equipped with an audible alarm earpiece 37. If decoder 26 of receiver 12 determines that the code with which received pulses 16 are encoded matches the code set in RAM 27, then indicating means 28 will cause the audible alarm earpiece 37 to sound, thereby informing the soldier 36 that the unidentified ground troops are friendly and should not be attacked. If the code with which the received pulses 16 are encoded does not match the code set in RAM 27, or if no response is received by the first receiver 12 within a given period of time after the first pulses 15 have been sent, then a second audible alarm, different from the first alarm, will sound in the ear piece 37, thereby informing the soldier 36 that the unidentified ground troops are enemy forces and can be attacked.

The OFFAS 10 described in FIG. 3 can also be used by the first concentration of ground troops to identify an unidentified aircraft. If the unidentified aircraft is friendly it will be equipped with the second receiver 13 and the second transmitter 14. In addition, the pilot will be wearing the audible alarm earpiece 33 and the momentary switch 34 will be located in the cockpit of the aircraft within easy reach of the pilot, so that if the second transmitter 14 is set to be manually activated, the pilot can easily do so. The OFFAS 10 can be configured so that the first and second transmitters are both equipped with directional and multidirectional light sources and so that the first and second receivers are both equipped with the indicator 29 and the switch means 30, thereby enabling a first concentration of ground troops to both identify and be identified by either a second, unidentified concentration of ground troops or an unidentified aircraft.

It will be understood that the embodiments described herein are merely exemplary and that a person skilled in the art may make many variations and modifications to the described embodiments utilizing functionally equivalent elements to those described. Any variations or modifications to the invention just described are intended to be included within the scope of said invention as defined by the appended claims.

We claim:

1. A mobile optical detection system for determining whether an unidentified object is hostile or friendly, comprising:

a first transmitter/receiver unit operable to initiate and transmit a coded optical signal and a second transmitter/receiver unit operable to receive said coded optical signal transmitted by said first transmitter/receiver unit and, upon determining that said coded signal corresponds with a predetermined code stored at said second transmitter/receiver unit, to cause a second coded optical signal to be transmitted to said first transmitter/receiver unit;

an indicating means coupled to said first transmitter/receiver unit and operable to provide an indication signal upon receipt by said first transmitter/receiver unit of said second coded optical signal whereby said first transmitter/receiver unit further comprises a first transmitter for transmitting a first series of optical pulses towards an unidentified object; and a first receiver coupled to said first transmitter and operable to receive optical signals from a remote transmitter;

whereby said second transmitter/receiver is associated with said unidentified object and further comprises a second receiver operable to receive and decode said first series of optical pulses; and a second transmitter coupled to said second receiver, wherein said second transmitter is operable to transmit a second series of optical pulses back towards said first transmitter/receiver after said second receiver receives said first series of optical pulses; and wherein said indicating means provides a signal after said second series of optical pulses are received by said first receiver, thereby providing an indication as to whether said unidentified object is friendly.

2. The system according to claim 1, wherein said second transmitter is automatically activated to transmit said second series of optical pulses after said second receiver receives said first series of optical pulses.

3. The system according to claim 1, wherein said first and said second transmitters each include a pulse generation means, a code generation means, an encoding means, a pulse modulation means and a light source, wherein a code established by said code generation means is used by said encoding means to encode a signal which in turn is used by said pulse modulation means to cause said light source to emit optical pulses having said code modulated therein.

4. The system according to claim 3, further including a second indicating means, wherein said second indicating means provides a second signal after said first pulses are received by said second receiver.

5. The system according to claim 4, further including a switch means for manually activating said second transmitter in response to said second signal provided by said second indicating means.

6. The system according to claim 1, wherein said first pulses are encoded by said first transmitter and decoded by said second receiver.

7. The system according to claim 1, wherein said second pulses are encoded by said second transmitter and decoded by said first receiver.

8. The system according to claim 1, wherein said first transmitter/receiver unit is operated from an airborne platform.

9. The system according to claim 1, wherein said first and said second receivers each include a lens means having a wide angle of view for receiving optical pulses from a remote transmitter, a notch filter means tuned to an optical frequency of interest, an image intensification means, a pulse detection means, a decoder/comparator means and a code storage means, wherein optical pulses impinging on said lens means are filtered by said notch filter, the output thereof being intensified by said image intensification means and thereafter detected by said pulse detection means, and said detected pulses are decoded and compared with said stored code by said decoder/comparator means.

10. A mobile Identification Friend Or Foe system for determining whether an unidentified object is hostile or friendly, comprising:

a first transmitter for transmitting a first series of coded optical pulses towards an unidentified object, said first transmitter being manually activated;

a first receiver associated with said unidentified object for receiving said first series of optical pulses;

a first indicating means coupled to said first receiver, said first indicating means providing a first signal after said first receiver receives said first series of optical pulses;

a second transmitter coupled to said first receiver, said second transmitter being manually activated and operable to transmit a second series of coded optical pulses back towards said first transmitter after said first indicating means provides said first signal;

a second receiver for receiving said second series of optical pulses, said second receiver being coupled to said first transmitter; and a second indicating means coupled to said second receiver, wherein said second indicating means provides a second signal after said second series of optical pulses are received by said second receiver, thereby indicating whether said unidentified object is friendly.

11. The system according to claim 10, wherein said transmitters include a multidirectional transmission means and a unidirectional transmission means, whereby one of said transmitters operating as a said second transmitter for transmitting said second series of optical pulses to a remote first receiver of unknown location uses said multidirectional transmission means and whereby one of said transmitters operating as a said first transmitter for transmitting said first series of optical pulses toward an unidentified object at a known location uses said unidirectional transmission means.

12. The system according to claim 11, wherein said unidirectional transmission means is pistol-shaped.

13. The system according to claim 10, wherein said first transmitter and said second receiver are operated from an airborne platform.

14. The system according to claim 10, wherein said first and said second transmitters each include a pulse generation means, a code generation means, an encoding means, a pulse modulation means and a light source, wherein a code established by said code generation means is used by said encoding means to encode a signal which in turn is used by said pulse modulation means to cause said light source to emit optical pulses having said code modulated therein.

15. The system according to claim 10, wherein said first and said second receivers each include a lens means having a wide angle of view for receiving optical pulses from a remote transmitter, a notch filter means tuned to an optical frequency of interest, an image intensification means, a pulse detection means, a decoder/comparator means and a code storage means, wherein optical pulses impinging on said lens means are filtered by said notch filter, the output thereof being intensified by said image intensification means and thereafter detected by said pulse detection means, and said detected pulses are decoded and compared with said stored code by said decoder/comparator means.

16. The system according to claim 10, wherein said first pulses are encoded by said first transmitter and decoded by said first receiver.

17. The system according to claim 10, wherein said second pulses are encoded by said second transmitter and decoded by said second receiver.

18. A method for determining whether an unidentified object is hostile or friendly, comprising the steps of:

transmitting a first coded optical signal from a first transmitter/receiver unit to a second transmitter/receiver unit operable to receive said first coded optical signal;

comparing said first coded optical signal received by said second transmitter/receiver unit with a predetermined code stored at said second transmitter/receiver unit;

transmitting a second coded optical signal from said second transmitter/receiver unit to said first transmitter/receiver unit upon a determination that said received first coded optical signal and said stored predetermined code correspond;

comparing said second coded optical signal received by said first transmitter/receiver unit with a second predetermined code stored at said second transmitter/receiver unit;

causing a verification signal to be produced indicative that said unidentified object is friendly, upon finding a match between said received second coded optical signal and said second stored predetermined code;

wherein said second transmitter/receiver is associated with said unidentified object and includes a receiver operable to receive and decode said first coded optical signal; and a transmitter coupled to said receiver, whereby said transmitter operates to transmit a second coded optical signal back towards said first transmitter/receiver after said receiver receives and decodes said first coded optical signal.

19. A method for determining whether an unidentified object is hostile or friendly, comprising the steps of:

transmitting a first coded optical signal from a first transmitter/receiver unit to a second transmitter/receiver unit operable to receive said first coded optical signal;

comparing said first coded optical signal received by said second transmitter/receiver unit with a predetermined code stored at said second transmitter/receiver unit;

transmitting a second coded optical signal from said second transmitter/receiver unit to said first transmitter/receiver unit upon a determination that said received first coded optical signal and said stored predetermined code correspond;

comparing said second coded optical signal received by said first transmitter/receiver unit with a second predetermined code stored at said second transmitter/receiver unit;

causing a verification signal to be produced indicative that said unidentified object is friendly, upon finding a match between said received second coded optical signal and said second stored predetermined code;

wherein said second transmitter/receiver is associated with said unidentified object and wherein a transmitter associated with each of said first and said second transmitter/receiver units includes a pulse generation means, a code generation means, an encoding means, a pulse modulation means and a light source, whereby a code established by said code generation means is used by said encoding means to encode a signal which in turn is used by said pulse modulation means to cause said light source to emit optical pulses having said code modulated therein.

20. A method for determining whether an unidentified object is hostile or friendly, comprising the steps of:

transmitting a first coded optical signal from a first transmitter/receiver unit to a second transmitter/receiver unit operable to receive said first coded optical signal;

comparing said first coded optical signal received by said second transmitter/receiver unit with a predetermined code stored at said second transmitter/receiver unit;

transmitting a second coded optical signal from said second transmitter/receiver unit to said first transmitter/receiver unit upon a determination that said received first coded optical signal and said stored predetermined code correspond;

comparing said second coded optical signal received by said first transmitter/receiver unit with a second predetermined code stored at said second transmitter/receiver unit;

causing a verification signal to be produced indicative that said unidentified object is friendly, upon finding a match between said received second coded optical signal and said second stored predetermined code;

wherein said second transmitter/receiver is associated with said unidentified object and wherein a receiver associated with each of said first and said second receivers includes a lens means having a wide angle of view for receiving optical pulses from a remote transmitter, a notch filter means tuned to an optical frequency of interest, an image intensification means, a pulse detection means, a decoder/comparator means and a code storage means, whereby optical pulses impinging on said lens means are filtered by said notch filter, the output thereof intensified by said image intensification means and thereafter detected by said pulse detection means, and said detected pulses decoded and compared with said stored code by said decoder/comparator means.

* * * * *